United States Patent [19]
Turner

[11] Patent Number: 6,041,229
[45] Date of Patent: *Mar. 21, 2000

[54] TRANSFERRING INFORMATION

[75] Inventor: Clive Nathan Turner, Turku, Finland

[73] Assignee: Nokia Mobile Phones, Ltd., Salo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/796,139

[22] Filed: Feb. 6, 1997

[30] Foreign Application Priority Data

Feb. 9, 1996 [GB] United Kingdom .................. 9602662

[51] Int. Cl.[7] ....................................... H04Q 7/90
[52] U.S. Cl. ........................ 455/420; 455/418; 455/557
[58] Field of Search ................................. 455/410, 418, 455/419, 420, 88, 90, 550, 557, 566, 551, 575, 186.1; 714/20, 15

[56] References Cited

U.S. PATENT DOCUMENTS

| | | | |
|---|---|---|---|
| 4,792,986 | 12/1988 | Gamer et al. | 455/418 |
| 4,805,211 | 2/1989 | Brennan et al. | 379/335 |
| 4,811,377 | 3/1989 | Krolopp et al. | 379/62 |
| 4,843,588 | 6/1989 | Flynn | 364/900 |
| 5,029,233 | 7/1991 | Metroka | 455/552 |
| 5,062,132 | 10/1991 | Yasuda et al. | 379/61 |
| 5,259,018 | 11/1993 | Grimmett et al. | 455/418 |
| 5,276,729 | 1/1994 | Higuchi et al. | 455/564 |
| 5,444,869 | 8/1995 | Stricklin et al. | 455/88 |
| 5,524,276 | 6/1996 | Littig et al. | 455/418 |
| 5,535,436 | 7/1996 | Yoshida et al. | 455/551 |
| 5,542,102 | 7/1996 | Smith et al. | 455/88 |
| 5,694,455 | 12/1997 | Goodman | 455/418 |
| 5,878,339 | 2/1999 | Zicker et al. | 455/552 |

FOREIGN PATENT DOCUMENTS 2253545  9/1992  United Kingdom.

*Primary Examiner*—Dwayne D. Bost
*Assistant Examiner*—Jean A. Gelin
*Attorney, Agent, or Firm*—Perman & Green, LLP

[57] ABSTRACT

Apparatus for transferring information from a first radio telephone to a second radio telephone comprises first communication means for communicating with the first radio telephone; second communication means for communicating with the second radio telephone; and data transfer means for communicating between the first and second communication means and operable under the control of the second radio telephone for reading information from the first radio telephone and transmitting that information to the second radio telephone.

14 Claims, 3 Drawing Sheets

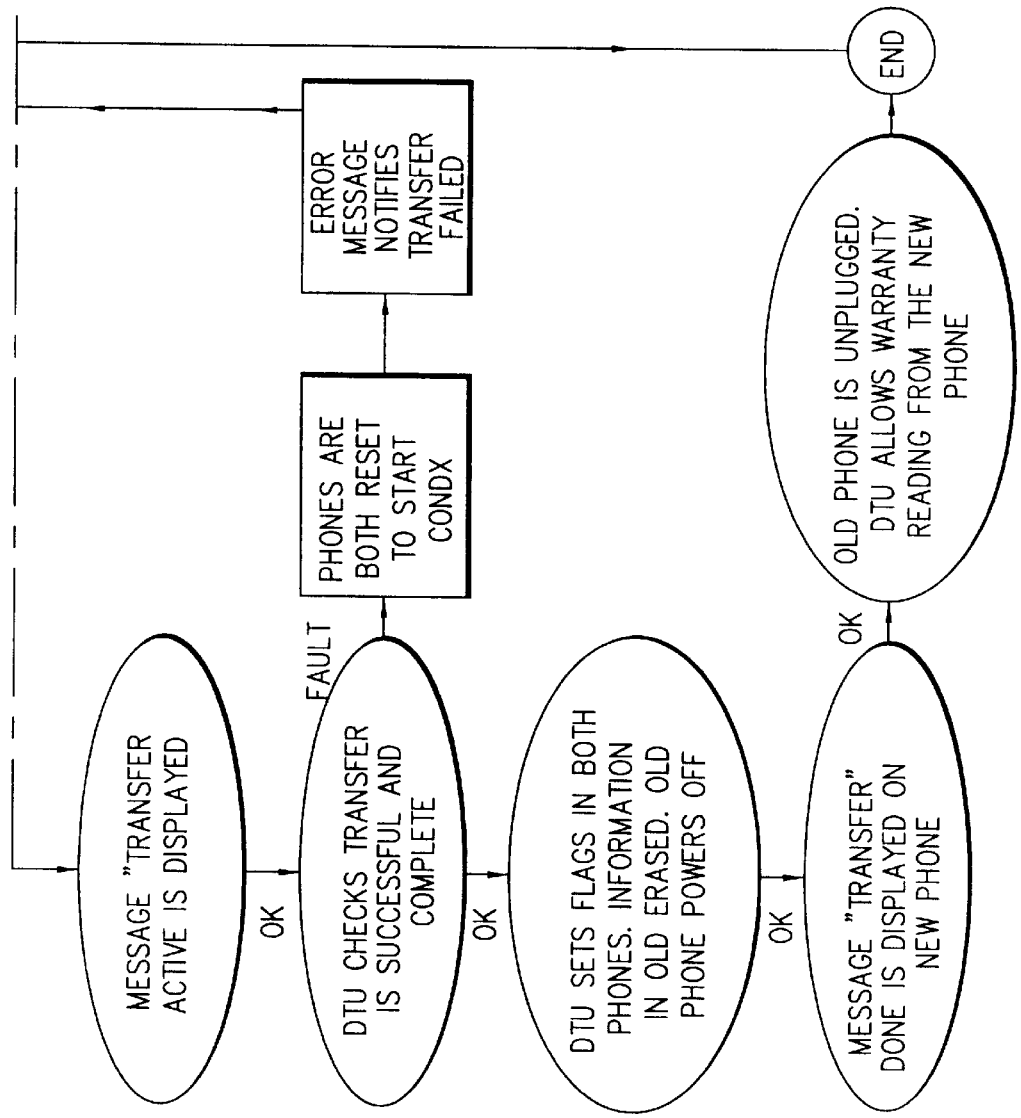

TRANSFERRING INFORMATION

FIELD OF THE INVENTION

The present invention relates to apparatus and a method for transferring information from a first radio telephone to a second radio telephone.

BACKGROUND OF THE INVENTION

Radio telephones typically have programmable memory for storing configuration information. Among other things the configuration information typically includes:

1. user-defined information—for instance a list of telephone numbers for speed dialling, and preference data defining the user's preferred settings of the telephone's features; and
2. telephone identification information—for instance the telephone's ESN (electronic serial number), telephone number, A-key and other security information for identifying the telephone to the network.

If the telephone breaks down and the user sends it for repair it is desirable for him to be provided with a replacement telephone. Ideally this replacement telephone should be configured in a similar way to the telephone that it replaces—it should have the user's speed dialling information and preferences and it should present to the network an identity that allows the user to continue to make and receive calls as before.

Prior solutions have had numerous disadvantages. One solution has been to use a computer of the type used for programming the telephone originally. This typically has a keyboard and monitor and an interface for connection to the telephone. The faulty telephone can be connected to the computer. Then software in the computer can be used to read the configuration information in the telephone and store it in the computer. Then the replacement telephone can be connected to the computer and the configuration information copied to it from the computer's memory. This solution has the disadvantages that the equipment is typically expensive and difficult to use. Also the system has important security risks: the computer could be used to fraudulently give more than one telephone the same configuration as the faulty telephone by copying the stored configuration information to a number of other telephones. Therefore, it may not be desirable to issue such computers to dealers.

Another solution (see U.S. Pat. No. 5,062,132) has been to provide the telephone with software which allows it to copy its configuration to another telephone that may be connected to it. This solution is not applicable to existing telephones that have not been provided with that software.

SUMMARY OF THE INVENTION

According to one aspect of the present invention there is provided apparatus for transferring information from a first radio telephone to a second radio telephone, comprising: first communication means for communicating with the first radio telephone; second communication means for communicating with the second radio telephone; and data transfer means for communicating between the first and second communication means and operable under the control of the second radio telephone for reading information from the first radio telephone and transmitting that information to the second radio telephone.

Preferably the data transfer means is operable to verify that the information has been stored correctly by the second radio telephone and, if so, deleting at least some of the information from the first radio telephone. One aim of this is to avoid the possibility of creating two telephones simultaneously having the same identity. Preferably this process is repeated. Most preferably a different item of information that is essential to the operation of the telephone (for example its successful connection to a network) is transferred each time. The data transfer means suitably has insufficient memory for storing all the configuration information of the first radio telephone.

Preferably the data transfer means comprises display control means for controlling a display of the second radio telephone when the second radio telephone is connected to the second communication means.

Preferably the information includes user-defined configuration information and/or identification information.

Preferably the data transfer means includes telephone comparison means for reading type or model information from the first and second radio telephones and inhibiting transfer of information between the radio telephones if the type or model information is incompatible.

According to a second aspect of the invention there is provided a method for transferring information from a first radio telephone to a second radio telephone, comprising the steps of: receiving a transfer initiation signal from the second radio telephone; reading information from the first radio telephone; and transmitting that information to the second radio telephone for storage by the second radio telephone.

Preferably the method also comprises the steps of: verifying that the information has been stored correctly by the second radio telephone; and, if so, deleting at least some of the information from the first radio telephone.

Preferably the method also comprises the step of controlling the display of the second radio telephone.

Preferably the method also comprises the steps of: reading type information from the first and second radio telephones; and inhibiting transfer of information between the radio telephones if the type information is incompatible.

BRIEF DESCRIPTION OF THE DRAWINGS

The present invention will now be described by way of example with reference to the accompanying drawings, in which.

DETAILED DESCRIPTION OF PREFERRED EMBODIMENTS

Figure 1:
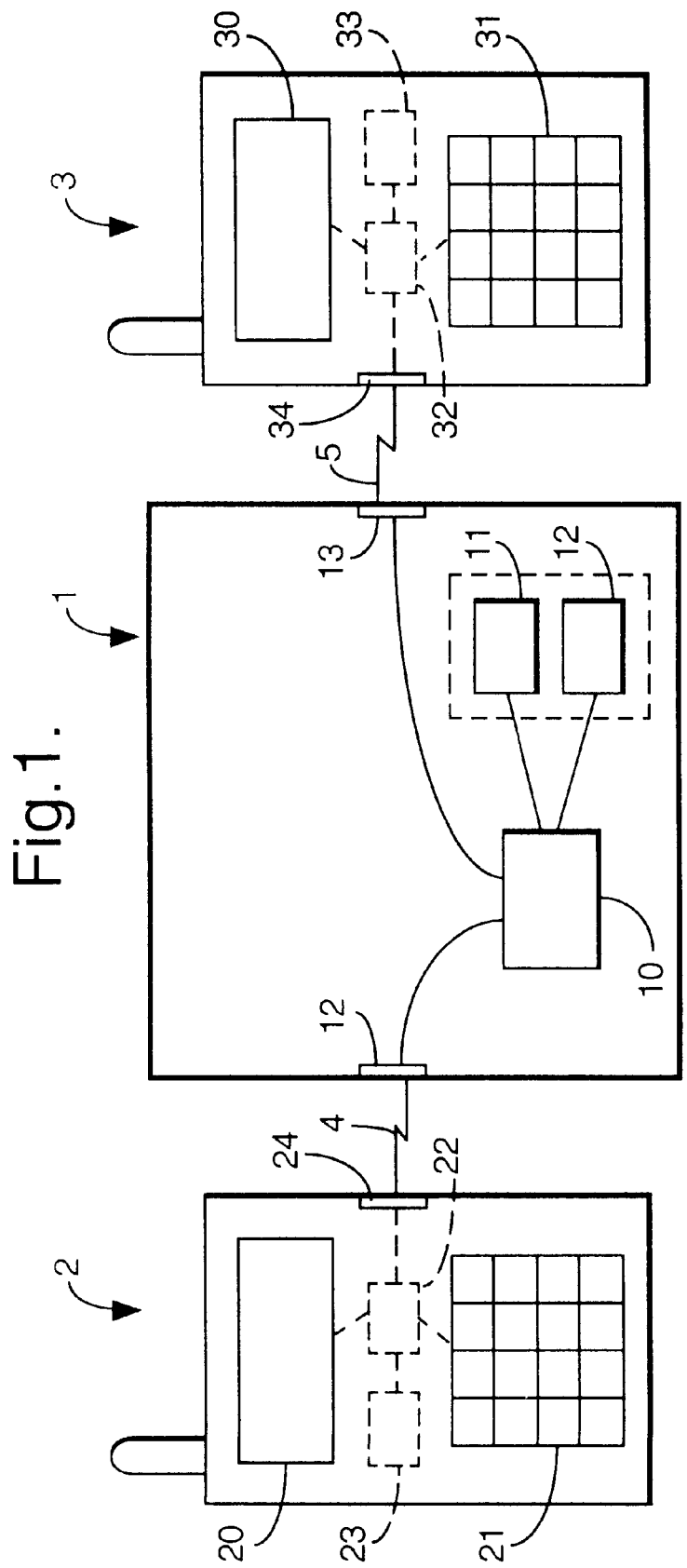
FIG. 1 is a schematic view of apparatus according to the present invention coupled to two telephones.

The figures show a data transfer unit (DTU) 1 according to the present invention connected to two portable radio telephones 2,3. Each telephone has a user interface comprising a display 20,30 and a keypad 21,31. These are connected to a processor 22,32 which communicates with a memory 23,33 and a standard communication bus port 24,34. This telephone architecture is well known.

The telephones are connected via their communication ports and cables 4,5 to the data transfer unit 1. The data transfer unit has a processor 10 which communicates with a memory 11,12 and two communication ports 12,13 which are connected to the cables 4,5. The data transfer unit has no keypad or display. The memory comprises a primary, non-volatile memory (in ROM or EPROM for example) which the data transfer unit can only read and which stores operating instructions for the processor 10, including memory maps for the telephones that the data transfer unit is able to service; and a secondary, volatile memory (in RAM for example) which can be read and written to by the data transfer unit.

Figure 2:
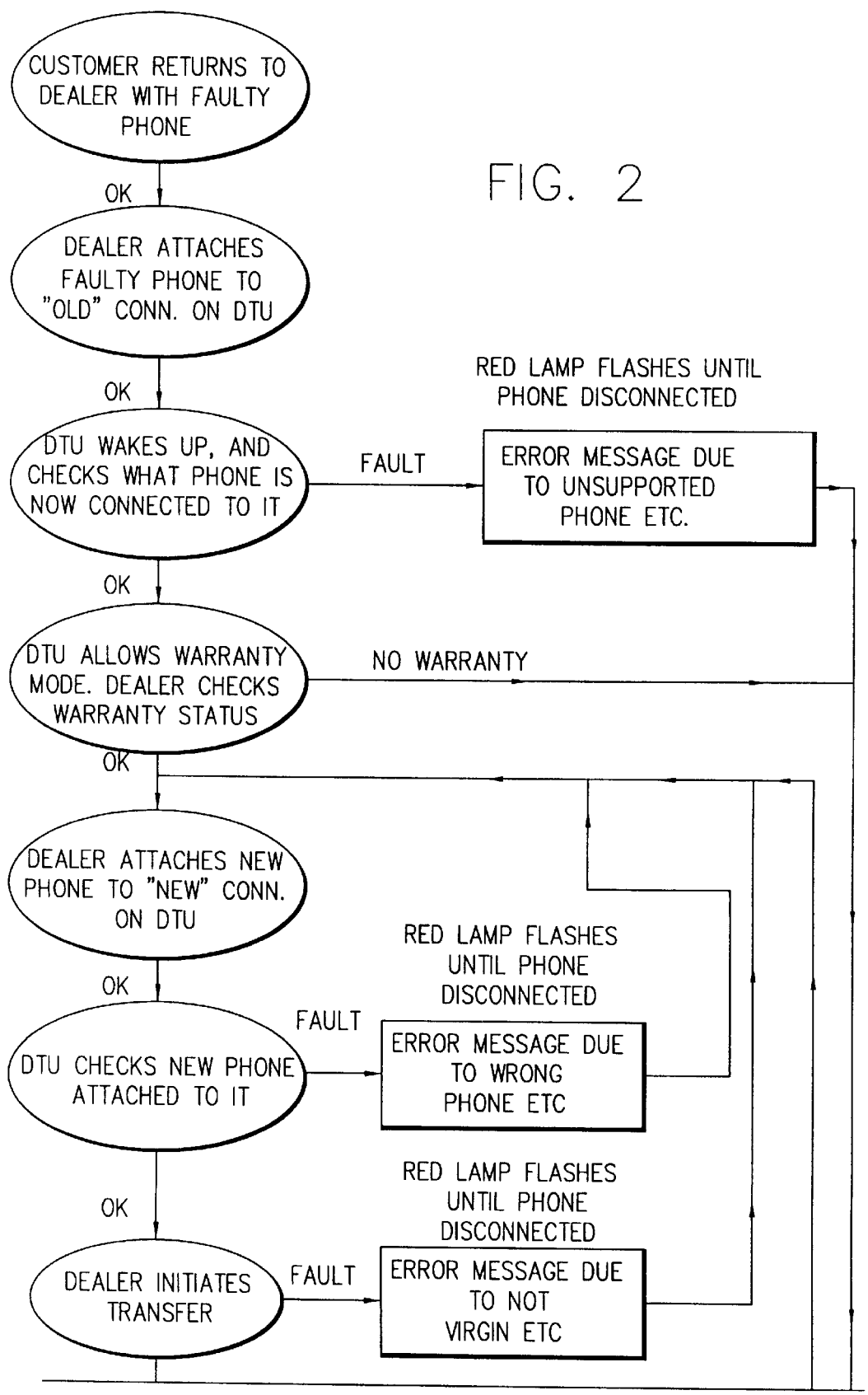
FIG. 2 is a flowchart illustrating the operation of the apparatus of FIG. 1.

The data transfer unit could be used at a telephone dealer's premises. When a user returns a faulty telephone to the dealer, either under warranty or not, the dealer can use the data transfer unit to transfer the configuration information from the faulty telephone to a replacement telephone. FIG. 2 shows steps in this procedure.

The dealer first connects the faulty telephone (2 in FIG. 1) to the data transfer unit via the cable 4. The data transfer unit establishes communication with the telephone and using its stored information on telephones' memories it establishes and stores in its secondary memory the model of the faulty telephone. If the faulty telephone is found (by comparison with the information in the data transfer unit's primary memory) to be of a type or model that the data transfer unit is able to service the data transfer unit communicates with the processor of the telephone to control the telephone's user interface, the data transfer unit receiving information from the telephone's keypad and transmitting information to the telephone's display. By means of this control the data transfer unit enables the dealer to interrogate warranty information (for example a stored date of expiry of the telephone's warranty) in the memory of the telephone using the telephone's user interface. The data transfer unit preferably does not have its own user interface. Alternatively the data transfer unit could enable software already present in the telephone, but normally disabled, to allow the warranty information to be interrogated.

If the dealer is satisfied with the warranty information he connects the replacement telephone (3 in FIG. 2) to the other port of the data transfer unit. The data transfer unit establishes communication with the replacement telephone and using its stored information on telephones' memories it establishes the model of the replacement telephone. If the replacement telephone is found to be of a model that is compatible with the faulty telephone (for example the same or an upgraded model) the data transfer unit proceeds with the transfer procedure. The data transfer unit breaks communication with the user interface of the faulty telephone and establishes control over the user interface of the replacement telephone (or enables software already present in the replacement telephone). The user interface of the second telephone is then enabled to control transfer of information from the faulty telephone to the replacement telephone. This has an important advantage over the system of U.S. Pat. No. 5,062,132 described above. The user interface of the faulty telephone may be faulty, in which case it may be impossible to control the transfer using the faulty telephone. The system of the present embodiment overcomes this problem.

The dealer initiates the transfer of configuration information from the faulty telephone to the replacement telephone using the user interface of the replacement telephone. The replacement telephone may be of a model that has in its memory a flag indicating whether it is already configured. In that case when the data transfer unit receives the instruction to begin the transfer it may check this flag and may refuse to transfer information (and cause a messaged to be displayed by the replacement telephone) if the flag is set, to prevent the configuration of the telephone from being altered. This avoids the telephone being reconfigured accidentally and prevents the dealer from re-circulating stolen or faulty telephones.

The data transfer unit then begins the procedure of transferring information from the faulty telephone to the replacement telephone. Using its memory map of the faulty telephone it interrogates the memory of the faulty telephone and copies configuration from the memory of the telephone to its own secondary memory. It then writes the information to the corresponding memory locations in the replacement telephone using its memory map of that telephone. When the information has been written it reads the information back from the replacement telephone to check that the information has been stored correctly and re-stores the information if necessary. It then erases the transferred information from the memory of the faulty telephone to ensure that the faulty telephone can no longer be used.

The data transfer unit and the telephones may co-operate to transfer all or some of the information in an encrypted form. For example the telephones may be provided with encryption means for, in response to a request by the data transfer means to read the memory of the faulty telephone, reading the requested information, encrypting it and then transmitting it to the data transfer means; and decryption means for reversing the operation when the data transfer means is to store information in the replacement telephone.

For security reasons it is desirable for it to be impossible for the data transfer unit to be used to clone telephones—that is to create two telephones simultaneously having the same identity. Therefore, when the information has been transferred the data transfer unit erases the information from its secondary memory. Also, the data transfer unit may transfer the configuration information in more than one stage, by repeating the process set out in the previous paragraph for blocks of the faulty telephone's memory. This ensures that even if the telephones are disconnected from the data transfer unit before the transfer process is complete the replacement telephone is not a clone of the faulty telephone. Preferably, in each block different identification information that is essential to the operation of the telephone is transferred. For example successive blocks could include information on successive parts of the telephone's A-key. The secondary memory of the data transfer unit may be arranged to be insufficient to store all the configuration information of the faulty telephone (or at least the telephone identification information) so that the information has to be transferred in stages.

Another possibility is for the data transfer unit to transfer the information directly from the faulty telephone to the replacement telephone without storing it in its secondary memory.

Transferring all of the configuration information in one block has the advantage that if power to the data transfer unit is cut during the transfer process there will not be two telephones each having part of the configuration information. However, this system may be less secure. To overcome any problems of partially configured telephones if a multiple-stage transfer process is used the data transfer unit may be provided with means for detecting that the telephones that it is connected to are partially configured and then resuming the transfer process.

When the transfer is complete the data transfer unit displays a message on the display of the replacement telephone and forces the faulty telephone to power down.

To administer a more secure warranty scheme the telephones may store other configuration information that is set by the data transfer unit and not transferred straightforwardly. For example when the transfer is complete the data transfer unit may set a "replaced" flag in the faulty telephone. As well as its own unique identification number (for instance its ESN) each telephone may also store a "root identity". Then when the data transfer unit caries out a transfer it can set the "root identity" of the faulty telephone to the unique identity of the faulty telephone, or the faulty telephone's own "root identity" if it was itself a replacement for another telephone, so that the original source of the configuration information can be traced. Provided information that is essential to the operation of the telephone is erased from the faulty telephone during the transfer procedure, information on the serial number or identity (for example the ESN) of the faulty telephone may usefully be left un-erased or encrypted in its memory to help if the telephone is serviced.

The data transfer unit could be used to transfer information from a telephone that is not faulty.

In view of the above description it will be clear to a person skilled in the art that various modifications may be made within the scope of the invention. The invention may include any novel features or combinations of features disclosed herein either explicitly or implicitly and any generalisations thereof irrespective of whether they relate to the invention as claimed or mitigate any of the problems addressed by the invention as claimed.

What is claimed is:

1. Apparatus for transferring information from a first radio telephone to a second radio telephone, comprising:

first communication means for communicating with the first radio telephone;

second communication means for communicating with the second radio telephone; and data transfer means for communicating between the first and second communication means and operable under the control of the second radio telephone for reading information from the first radio telephone and transmitting that information to the second radio telephone, wherein the data transfer means includes telephone comparison means for reading type information from the first and second radio telephones and inhibiting transfer of information between the radio telephones if the type information is incompatible.

2. Apparatus as claimed in claim 1, wherein the data transfer means is operable to verify that the information has been stored correctly by the second radio telephone and, if so, deleting at least some of the information from the first radio telephone.

3. Apparatus as claimed in claim 1, wherein the data transfer means comprises display control means for controlling a display of the second radio telephone when the second radio telephone is connected to the second communication means.

4. Apparatus as claimed in claim 1, wherein the information includes user-defined configuration information.

5. Apparatus as claimed in claim 1, wherein the information includes identification information.

6. A method for transferring information from a first radio telephone to a second radio telephone, comprising the steps of:

receiving a transfer initiation signal from the second radio telephone;

reading information from the first radio telephone;

transmitting that information to the second radio telephone for storage by the second radio telephone; and wherein the transmitting step includes steps of comparing reading type information from the first and second radio telephones, and inhibiting transfer of information between the radio telephones if the type information is incompatible.

7. A method as claimed in claim 6, comprising the steps of:

verifying that the information has been stored correctly by the second radio telephone; and, if so, deleting at least some of the information from the first radio telephone.

8. A method as claimed in claim 7, comprising the step of controlling the display of the second radio telephone.

9. A method as claimed in claim 8, comprising the steps of:

reading type information from the first and second radio telephones; and inhibiting transfer of information between the radio telephones if the type information is incompatible.

10. A method as claimed in claim 7 further comprising steps of employing a data transfer unit for comparing the first radio telephone with a model of the first radio telephone, and verifying that the first radio telephone is of a type suitable for transferring data via the data transfer unit to the second telephone.

11. Apparatus for transferring information from a first radio telephone to a second radio telephone, the second radio telephone being operable with proper operation and the first radio telephone having defective operation, the apparatus comprising:

first communication means for communicating with the first radio telephone;

second communication means for communicating with the second radio telephone; and data transfer means for communicating between the first and second communication means and operable under the control of the second radio telephone for reading information from the first radio telephone and transmitting that information to the second radio telephone; and wherein the data transfer means is operative to provide for a deletion of information in the first radio telephone to avoid a common identity for the first radio telephone and the second radio telephone.

12. Apparatus as claimed in claim 11, wherein the data transfer means includes telephone comparison means for reading type information from the first and second radio telephones and inhibiting transfer of information between the radio telephones if the type information is incompatible.

13. A method for transferring information from a first radio telephone to a second radio telephone, comprising the steps of:

connecting a data transfer device between the first telephone and the second telephone;

receiving, at the data transfer device, a transfer initiation signal from the second radio telephone;

reading, by the data transfer device, information from the first radio telephone;

transmitting, by the data transfer device, that information to the second radio telephone for storage by the second radio telephone; and at the data transfer device, deleting information in the first radio telephone to avoid a common identity for the first radio telephone and the second radio telephone.

14. A method as claimed in claim 13, wherein the transmitting step includes steps of comparing, via the data transfer device, reading type information from the first and second radio telephones, and inhibiting transfer of information between the radio telephones if the type information is incompatible.

* * * * *